Aug. 14, 1928.
A. ANGELL
1,680,584
DISTRIBUTOR FOR CONDIMENTS AND THE LIKE
Filed March 3, 1927     2 Sheets-Sheet 1
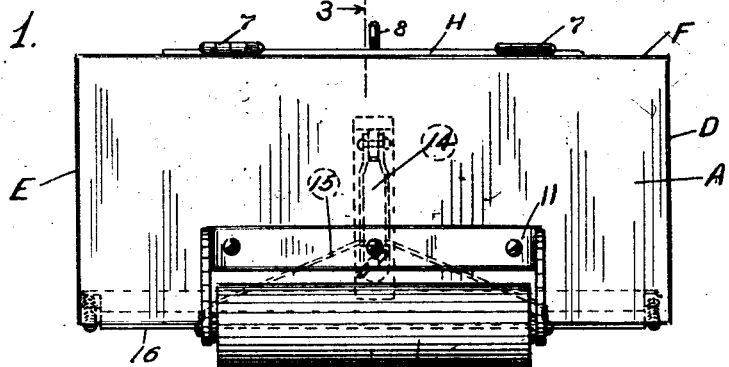
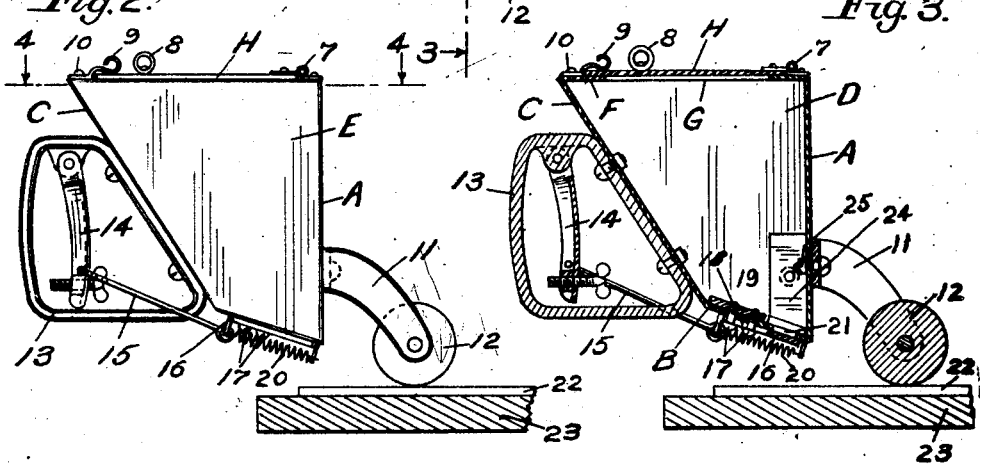
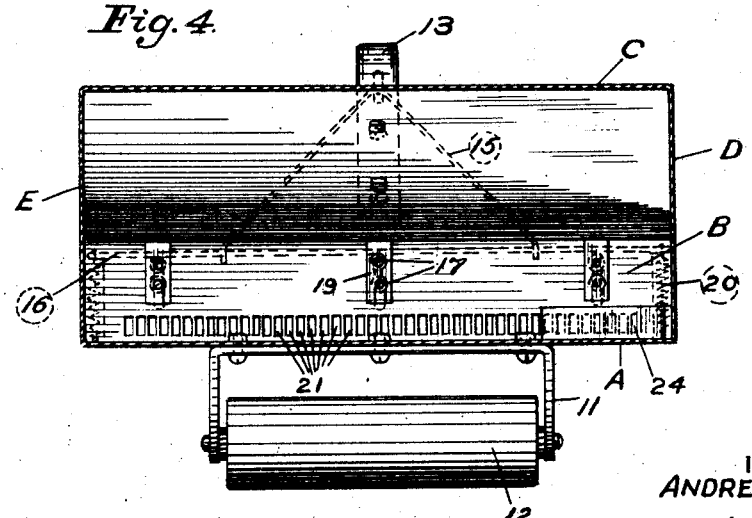
INVENTOR
ANDREW ANGELL
BY
ATTORNEY Aug. 14, 1928.
A. ANGELL
1,680,584
DISTRIBUTOR FOR CONDIMENTS AND THE LIKE
Filed March 3, 1927    2 Sheets-Sheet 2
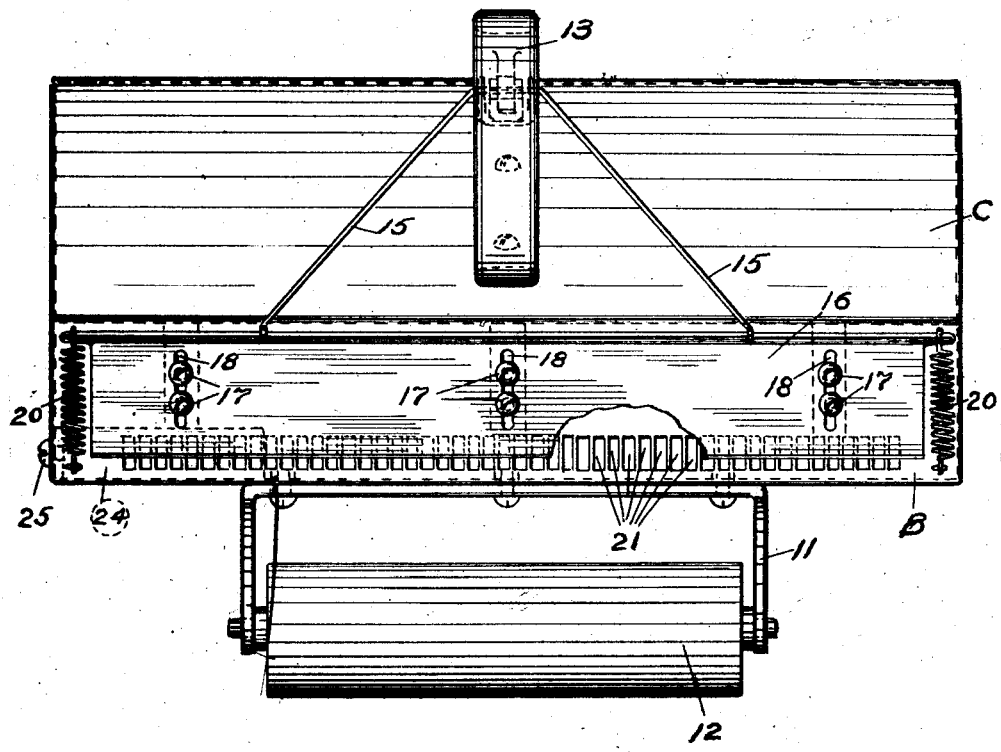
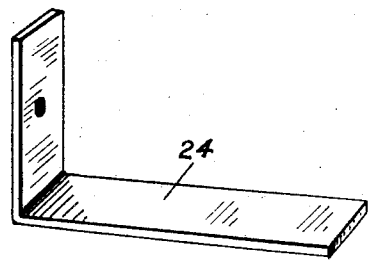
INVENTOR
ANDREW ANGELL
BY
ATTORNEY

Patented Aug. 14, 1928.  1,680,584

UNITED STATES PATENT OFFICE.

ANDREW ANGELL, OF MINNEAPOLIS, MINNESOTA.

DISTRIBUTOR FOR CONDIMENTS AND THE LIKE.

Application filed March 3, 1927. Serial No. 172,444.

This invention relates to apparatuses for use in bakeries, and the primary object is to provide means, of a simple, practical and efficient nature, for uniformly spreading sugar, cinnamon, or other similar condiments or substances over a sheet or layer of dough, prior to baking. The device is particularly useful in the making of "cinnamon rolls," where a considerable quantity of sugar and cinnamon are spread upon a long sheet of dough, whereupon the sheet is rolled, longitudinally, after which it is cut up, transversely, in substantially round slices which are baked and become the commercially known "cinnamon rolls." More detailed and specific objects will be disclosed in the course of the following specification, reference being had to the accompanying drawings, in which:

Fig. 1 is a front elevation of the device.

Fig. 2 is an end elevation of the device as seen from the left in Fig. 1 and illustrating the position it assumes, with respect to the sheet of dough, when in use.

Fig. 3 is a sectional elevation, as on the line 3—3 in Fig. 1.

Fig. 4 is a sectional plan view, as on the line 4—4 in Fig. 2.

Fig. 5 is an enlarged bottom plan view of the device, a fractional portion being broken out.

Fig. 6 is an enlarged detail perspective view of the member.

Referring to the drawing more particularly and by reference characters, A, B and C designate the continuously formed front, bottom and rear walls, respectively, of a container having end walls D and E, and a top F having an opening G closed by a lid H. The lid H is preferably hinged, as at 7, has a finger grip 8, and is held closed by a spring clip 9 which is pivoted to the top wall F as at 10.

Secured to the front wall A is an outwardly and downwardly projecting, substantially U-shaped yoke 11, in which is journaled a roller 12, and upon the rear wall C is rigidly secured a handle forming bracket 13, within which is pivotally carried a finger gripping lever 14. This lever 14 has a set screw by which the limit of its rearward movement, with respect to the handle 13, may be adjusted at will. The handle lever 14 is connected, by a bail 15, to a plate 16, which is slidably carried, adjacent to the bottom B, by sets of screws 17. These screws extend through slots 18, in the plate 16, and are secured in the bottom B and also in small blocks 19, whereby they may be adjusted to snugly hold the members B and 16 together.

The plate is normally and yieldingly held in an advanced position by a pair of springs 20, and when in this position closes or covers a series of elongated perforations 21 in the bottom section B. By gripping the handle members 13—14, however, the bail 15 retracts the plate 16 so as to partly uncover the perforations 21, as shown in Fig. 5.

When in use, after the container A—F has first been supplied with sugar and cinnamon, or other substances, and after the dough has been suitably rolled out into a strip or sheet 22, as on the table 23, the device is moved forward, or rearward, when in the position indicated in Figs. 2 and 3. And when so being moved the operator, by clamping the members 13—14, retracts the plate 16, thus partly opening the perforations 21, and allowing the contents of the container to sift down in an even stream or layer upon the dough. When the end of the dough strip is reached the lever 14 is released, thus permitting the springs 20 to restore the plate 16 to its perforation closing position. In the event that it is desirable to reduce the width of the stream of material from the container, I provide an angle iron member 24 which can be conveniently secured in the container, as by a screw 25, so as to permanently cover some of the end perforations 21, as shown in the drawing. This member may readily be removed at will and may obviously be of any length desired.

It is understood that suitable modifications may be made in the general design and structural details of the invention as herein shown, provided, however, that said modifications come within the spirit and scope of the appended claims.

Having now therefore fully shown and described my invention, what I claim to be new and desire to protect by Letters Patent is:

1. A baker's device for distributing condiment and the like of the character described comprising a container having closely arranged perforations in its base, a plate normally closing the perforations, a handle for moving and guiding the device, and means associated with the handle for moving the plate to expose the perforations.

2. A baker's device for distributing condiment and the like of the character described comprising a container having closely arranged perforations in its base, a plate normally closing the perforations, a handle for moving and guiding the device, and means associated with the handle for moving the plate to expose the perforations, and means for movably supporting the device.

3. A baker's distributor for condiment and the like comprising a container having a roller support, and having a rearwardly extending handle for guiding the same, said container having a transverse series of perforations, a plate slidably mounted adjacent to the perforations, spring means for normally holding said plate in closing position with respect to the perforations, and means for retracting the plate to expose the perforations.

4. A baker's distributor for condiment and the like comprising a container having a roller support, and having a rearwardly extending handle for guiding the same, said container having a transverse series of perforations, a plate slidably mounted adjacent to the perforations, spring means for normally holding said plate in closing position with respect to the perforations, and means for retracting the plate to expose the perforations, and adjustable means for limiting the movement of the plate.

5. A baker's distributor for condiment and the like comprising a container having a roller support, and having a rearwardly extending handle for guiding the same, said container having a transverse series of perforations, a plate slidably mounted adjacent to the perforations, spring means for normally holding said plate in closing position with respect to the perforations, and a lever member connected with the plate for retracting the latter.

6. A baker's distributor for condiment and the like comprising a container having a roller support, and having a rearwardly extending handle for guiding the same, said container having a transverse series of perforations, a plate slidably mounted adjacent to the perforations, spring means for normally holding said plate in closing position with respect to the perforations, and a lever associated with the handle and operatively connected with the plate.

7. A baker's distributor for condiment and the like comprising a container having a roller support, and having a rearwardly extending handle for guiding the same, said container having a transverse series of perforations, a plate slidably mounted adjacent to the perforations, spring means for normally holding said plate in closing position with respect to the perforations, and means for retracting the plate to expose the perforations, and means, independent of the plate, for permanently closing a limited number of the perforations.

In testimony whereof I affix my signature.

ANDREW ANGELL.